United States Patent

[11] 3,530,773

[72] Inventors Paul Kühnle,
Winnenden;
Fritz Gaukler, Stuttgart-Feuerbach,
Germany
[21] Appl. No. 745,338
[22] Filed July 11, 1968
[45] Patented Sept. 29, 1970
[73] Assignee Fa. Fr. Hesser Maschinenfabrik A.G.,
Stuttgart-Bad Cannstatt, Germany,
a corporation of Germany
[32] Priority July 12, 1967
[33] Germany
[31] H 63,261

[54] FORMING MANDREL FOR MACHINE FABRICATING PACKAGING CONTAINERS
12 Claims, 9 Drawing Figs.
[52] U.S. Cl. .................................................. 93/12,
93/59, 156/389, 156/583

[51] Int. Cl. .................................................. B31b 1/28
[50] Field of Search ........................................ 93/59CE,
59ES, 12, 44.1; 156/389, 583

[56] References Cited
UNITED STATES PATENTS
2,121,135  6/1938  Vergobbi ..................... 93/59X
2,671,383  3/1954  Jungmayr ..................... 93/12

Primary Examiner—Bernard Stickney
Attorney—Edward E. Sachs

ABSTRACT: Apparatus for making a bag of at least partly heat seal responsive material in which the bag is formed around a mandrel. The mandrel constructed is in two parts and radially expands about a pivot axis and is provided with lifting pins to lift and if necessary sever the heat sealed area of the bag from the mandrel upon completion of the heat seal step.

Patented Sept. 29, 1970 3,530,773
Sheet 1 of 2
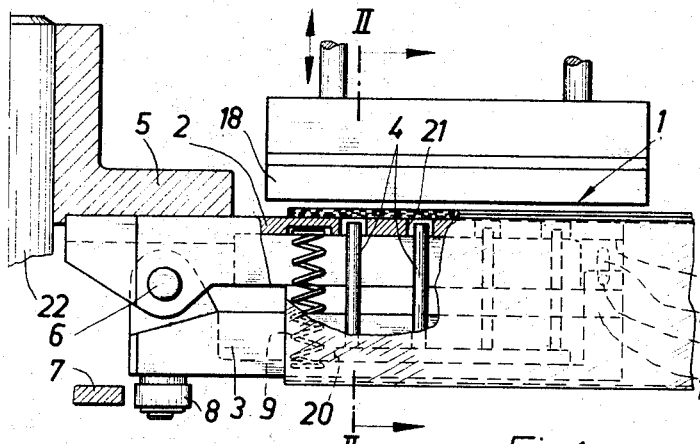 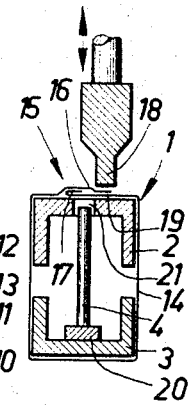
Fig.1  Fig.2
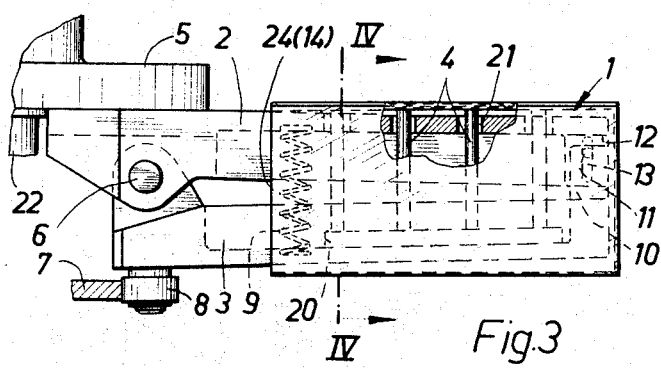 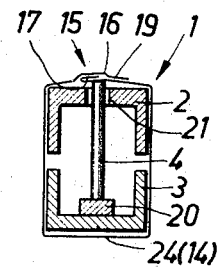
Fig.3  Fig.4
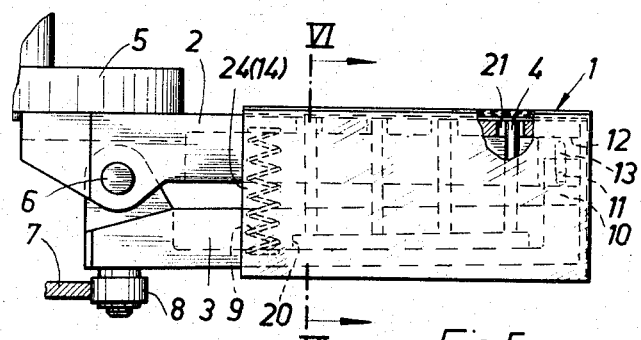 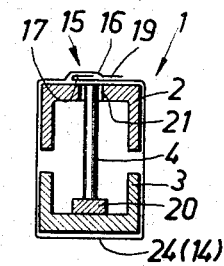
Fig.5  Fig.6
Inventors
PAUL KÜHNLE
FRITZ GAUKLER
Edward S. Sachs
ATTORNEY

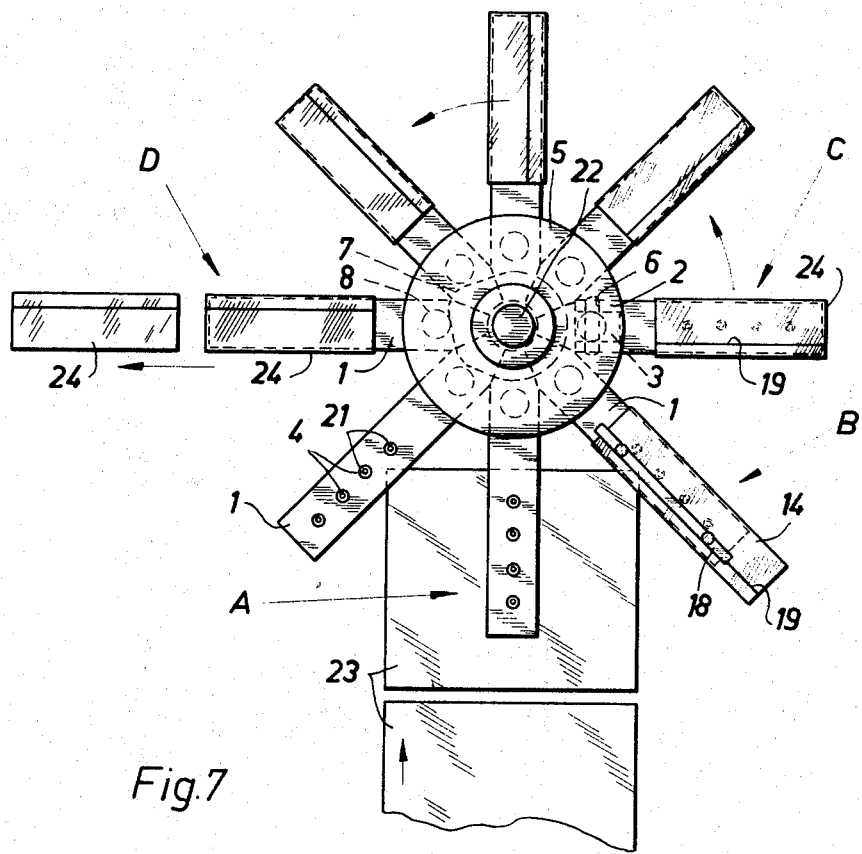
Fig.7
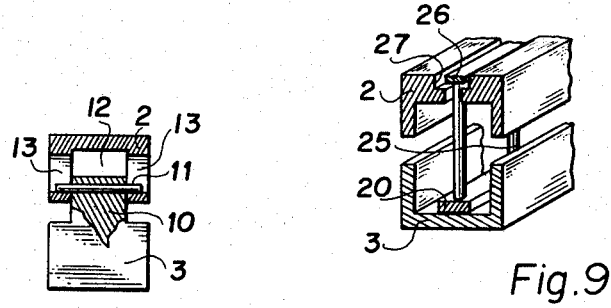
Fig.8
Fig.9

3,530,773

FORMING MANDREL FOR MACHINE FABRICATING PACKAGING CONTAINERS

The invention relates generally to a packaging machine and more specifically to an improved forming mandrel for the fabrication of bags and similar packaging containers in which at least one side of the packaging material is heat seal responsive.

In automatic packaging machinery using form-shaping mandrels it is known that the heat seal or bonding of bags, boxes, or the like, particularly the longitudinal seams thereof, frequently causes sticking difficulties between the mandrel and the heat sealed area of the packing material. This results in operational interruptions and a delay in the transfer time from the forming mandrel to the next processing station. This difficulty arises from the application of heat to the heat responsive areas of the packing material which causes the bag or bag sleeve to adhere to the forming mandrel. Such interference in high speed packaging machines can have serious and deleterious effects upon the efficiency of such devices. The problem referred to above is also experienced in the fabrication of tubular boxes or bags in which the longitudinal seam is first constructed as an upwardly extending so-called "fin-seal" which is turned upon the wall of the bag and is thereafter secured thereto.

To overcome these difficulties it has already been proposed to coat or cover the forming mandrel with stick resistant material such as polytetrafluorethelene or silicon type rubber. However, experience has shown that even these precautions do not always prevent the sticking of the packaging container to the forming mandrel.

It is therefore the primary object of this invention to provide a packaging machine in which the forming mandrel is provided with a mechanism which acts in sequence with the operating cycle of the packaging machine to sequentially lift the heat sealed areas of the bag sleeve off the forming mandrel.

In view of the preceding paragraph it is thus another object of the present invention to provide a forming mandrel for a packaging machine which eliminates the difficulties experienced with prior art devices and improves the efficiency of packaging machinery of the type herein under consideration.

It is another object of this invention to provide an improved forming mandrel which does not impede the operating speed of the packaging machinery and is effective to function operational without damage to the packaging containers.

One aspect of the present invention resides in providing a forming mandrel having an internally arranged mechanism which protrudes outwardly through the surface of the mandrel facing the heat seal tool, in proper sequence with the operation of the packaging machine, in such a manner, so that the packaging material is lifted off the surface which heretofore has caused the sticking problem.

Another aspect and preferred embodiment of the invention resides in the provision of a mechanism located within the forming mandrel which is comprised of a plurality of pins which are disposed vertically relative to the longitudinal axis of the forming mandrel and in which the pins are movable into and through an opening of the mandrel in the surface in juxtaposition to the heat seal tool in order to perform the above-described lifting function.

Another aspect of the present invention resides in the provision of a forming mandrel for packaging machinery of the type above described which is constructed in two parts which are movable radially relative to each other for the purpose of simplifying the withdrawal of the packaging container from the forming mandrel.

For a better understanding of the present invention, together with other and further objects thereof, reference is had to the following description taken in connection with the accompanying drawings, and its scope will be pointed out in the appended claims.

In the drawings:

FIG. 1 is a fragmentary side view, partly in section, of the forming mandrel in accordance with this invention and of related parts of the packaging machine;

FIG. 2 is a cross-sectional view taken along line 2-2 of FIG. 1;

FIG. 3 is a view similar to FIG. 1 of the mandrel showing the mandrel during a different operating sequence;

FIG. 4 is a cross-sectional view taken along lines 4-4 of FIG. 3;

FIG. 5 is a side view similar to FIG. 1 of the mandrel showing still another operating sequence;

FIG. 6 is a cross-sectional view taken along lines 5-5 of FIG. 5;

FIG. 7 is a generally diagrammatic plan view of the packaging machine;

FIG. 8 is an end view of the mandrel illustrating the detent mechanism partly in cross-section; and FIG. 9 is a cross-sectional view of the mandrel, similar to FIG. 3, but illustrating in perspective a modification of the invention.

For ease of illustration and to provide a better understanding of the present invention reference may first be had to FIG. 7 which shows a packaging machine embodying several forming mandrels 1 in accordance with this invention. Each mandrel 1 is secured to and extends equidistantly and radially from a mandrel wheel 5 mounted on a rotatable shaft 22 which drives the mandrel wheel step-wise in a predetermined sequence. The forming of the packaging container is performed at different stations around the mandrel wheel. At station A a blank 23 is placed around a mandrel 1 and shaped thereat into a tubular sleeve 14 and provided with a so-called "fin-seal" seam 15 in a manner as for example described in U.S. Pat. No. 3,140,643, which is assigned to the same assignee as the present invention. As the mandrel carrying the sleeve 14 advances from station A to station B the "fin-seal" seam 15 is turned upon the sleeve 14 and then bonded thereto by means of a heat seal bar 18. At station C one end of the sleeve 14 is closed in a conventional manner to form a bag 24, by means of equipment as for example shown in U.S. Pat. No. 3,088,380.

Those skilled in the art will appreciate that it is possible to interchange stations B and C so that the sleeve 14 will be first closed at one end and only then is the "fin-seal" seam 15 secured to the wall of the bag 24. At station D the bags 24 are withdrawn from the mandrel 1 and transferred to a conventional bag filling and closing machine, not shown.

Referring now more particularly to the improved forming mandrel 1, which is shown in greater detail in FIGS. 1 to 6, the mandrel 1 is composed of an upper portion 2 and a lower portion 3 which are pivotally connected at their common rear end, adjacent to the wheel 5, by means of a pivot pin 6 which extends transversely through both mandrel portions. The mandrel members 2, 3 are elongated and in cross section each is generally U-shaped.

The mandrel portions 2, 3 comprise a hollow and elongated bar having a generally rectangular cross section with the upper surface of the mandrel portion 2 being welded, or otherwise secured to the wheel 5 whereby, in operation, the mandrel as a whole rotates in unison with the wheel. Each of the mandrel portions 2, 3 is provided with a suitable inwardly facing recess to receive and seat a compression spring 9 which is interposed therebetween to bias the lower part 3 downwardly. The forward ends of portions 2, 3 are slidably interlocked to establish and maintain a predetermined cross-sectional configuration of the mandrel 1. For this purpose the lower mandrel portion 3 is provided with a vertically extending guide nose or projection 10, see FIG. 8, which carries at its upper end a detent pin 11 extending transverse to the mandrel and thus parallel to the axis of the pin 6. The guide nose 10 slides into a guide slot 12 provided in the forward end of the mandrel portion 2. The movement of detent pin 11 is limited in its location within a vertically extending slot 13 located in the upper part of the forming mandrel which circumscribes and thus limits the total pivotal movement of the mandrel 1 and thereby predetermines the total cross section of the forming mandrel 1.

The radial movement of the lower mandrel portion 3 relative to the upper part 2 is actuated and controlled by a cam 7, shown only in part, and a cam follower 8 rigidly secured to the mandrel part 3 at the bottom surface thereof proximate to the rear end in suitable proximity to the cam 7. As shown, the cam follower 8 is a roller which in operation bears against the cam surface 7, for instance see FIG. 3, for causing the mandrel portion 3 to move radially up and down about pivot 6 in a predetermined sequence timed in synchronization with the operating cycle of the machine.

Interposed between the mandrel portions 2, 3 are a plurality of cylindrical lifting pins 4 which are equidistantly spaced within and along the center of the mandrel and are mounted to a common bracket 20 which in turn is rigidly secured to the inner bottom surface of the lower mandrel portion 3. The pins 4 extend vertically transverse to the longitudinal axis of the forming mandrel 1 and are of substantially the same length. In their normal or non-actuating position each pin protrudes into an opening 21 which is provided in suitable juxtaposition in the upper mandrel portion 2.

The packaging material used in conjunction with the above noted machinery, has at least one side coated with or is composed of a heat seal responsive material and during formation of the bag the heat seal responsive surface is placed against, and the blank 23 is folded around, the mandrel 1 and formed into a tube-like sleeve 14. The sleeve is provided with a fin-like projecting seam 15 extending parallel to the longitudinal axis of the forming mandrel. The two seam margins, see 16 and 17, have a width which is at least in part unequal. The fin-like seam 15 is then folded upon sleeve 14 in such a manner so that the seam margin with the greater width, see 16, extends beyond the narrower margin 17 and a heat seal responsive projection 19 of margin 16 faces the tubular sleeve 14 and covers the narrower margin 17. A conventional heating bar 18, see FIGS. 1 and 7, is arranged above the mandrel 1 and positioned to heat seal the projection 19 upon the sleeve 14 whereby the upper part 2 of the forming mandrel 1 serves as a support tool when the bar 18 bears against the sleeve.

The location of the openings 21, which are adapted to receive the pins 4, within the upper part 2 of the mandrel 1, is selected so that the openings are near or directly below the projection 19 which has been fastened to the sleeve 14.

The finished bag 24 has the tendency to adhere at times, and to a varying degree, with its inner surface along the zone of the mandrel on which the folded seam 15 has been heat fastened. It is at this point that the present invention is utilized. This time coincides just prior to the withdrawal or transfer of the bag to the next processing station.

The loosening or detachment of the inner surface of the bag 24 from the upper surface of the adjacent mandrel portion 2 is effected by the actuation of the cam member 7 (for instance by wheel 5) which is brought to bear upon the cam follower 8.

The cam follower 8 travels along the predetermined cam path of cam 7 and causes the lower mandrel portion 3 to radially move about the pivot axis 6 against the bias of the spring 9 in the direction of the upper mandrel portion 2. Due to this movement the pins 4 on mounting bracket 20 are caused to move upward, together with the lower mandrel portion 3, through the openings 21. The cam action upon the lower mandrel portion 3 continues until the pins protrude beyond the upper mandrel portion surface, as is best illustrated in FIG. 3, and lift the areas of the bag 24 subject to adhesion off the mandrel as shown in FIG. 4. Thereafter the cam follower 8 rolls along a path on cam 7 permitting the mandrel portion 3 to move radially lower thereby retracting the pins 4 from beyond the upper surface of mandrel portion 2. This cam path is continued until the upper end faces of the pins 4 are in the same plane as the upper surface of the mandrel portion 2, substantially as shown in FIGS. 1 and 2, thereby terminating the engagement with the bag 14. The spring 9 facilitates the pivotal downward movement of the lower mandrel portion 3 until the detent pin 11 arrests the movement by engaging the lower limit of the slot 13 of mandrel portion 2.

Since the axial length of the pins 4 has been selected so that they terminate slightly below the surface of the upper mandrel portion 2 when the mandrel 1 is in its expanded position, the forming mandrel will exhibit a smaller cross-sectional area than its predetermined maximum cross section when the pins 4 are flush with the upper surface of the mandrel portion 2 so that the withdrawal of the bag 24 can then proceed in the conventional manner.

As a modification of this invention it is of course entirely possible to form the pins 4 with a cross section which is out of round. Furthermore in lieu of individual lifting pins a continuous lifting bar may be secured to the bottom mandrel member 3 in which case a continuous, although relatively narrow, slit is substituted for the plurality of openings 21 or, as shown in FIG. 9, pins 25 secured to bracket 20 carry at their upper end a continuous lifting bar 26 arranged within longitudinally extending groove 27 of mandrel portion 2. The lifting bar 26 is raised and lowered by the pivotal movement of mandrel portion 3 as above described. To those skilled in the art it will be also obvious that driving means other than the cam arrangement for lifting the pins may be utilized.

While FIG. 1 shows the pins 4 in a slightly retracted position, the heat sealing and fastening of margin 16 may also take effect while the upper ends of the pins are flush with the plane of the upper surface of the forming mandrel 2. In this case a seal may be made against the pins 4. Upon completion of the heat sealing the pins are then briefly retracted to detach the pins from the inner side of the bag.

In addition it should be noted, as already alluded to above, that the pins 4 may be utilized in conjunction with a bag construction having overlapping seams formed around the forming mandrel 1. In this modification it is also possible for the pins 4 to engage the bag upon as well as near the overlapping seams.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

We claim:

1. In a machine for fabricating packaging containers of at least partly heat seal responsive material having an assembly for seaming and heat sealing blanks into bags and the like, and a heat seal tool for bearing against a mandrel, comprising: an elongated forming mandrel for supporting said blanks placed into contact with and around said mandrel; and mechanical lifting means structurally associated with said mandrel and effective for periodic interposition between the mandrel and the packaging container to increase the distance therebetween in the heat sealed area of the latter to sever any adhesive connection between said container and said mandrel.

2. In a machine according to claim 1, wherein said mechanical lifting means is actuated in timed relation to the operating cycle of the machine.

3. In a machine according to claim 2, wherein said mandrel is formed with at least one opening located substantially facing the heat seal tool; and wherein said lifting means is arranged within said mandrel and upon activation of the latter penetrates through said opening.

4. In a machine according to claim 3, wherein said mandrel has at least two openings and into each of said openings protrudes a movable lifting pin.

5. In a machine according to claim 4, wherein said pins extend vertically and transverse relative to the longitudinal axis of said forming mandrel and are of substantially the same length.

6. In a machine according to claim 5, wherein said pins are secured to a common mounting bracket.

7. In a machine according to claim 3, wherein said mandrel comprises an upper and a lower portion, said upper portion defining said opening, and the lifting mechanism being secured to said lower portion.

8. In a machine according to claim 3, wherein said lifting means includes a continuous lifting bar which can be raised beyond said opening.

9. In a machine according to claim 7, wherein said upper and lower portions are pivotably connected and a spring is interposed therebetween; and detent means effective for limiting the pivotable movement between said portions.

10. In a machine according to claim 7, wherein said lifting means comprises a plurality of pins.

11. In a machine according to claim 7, and cam means bearing against said mandrel for controlling the pivotal movements of one mandrel portion.

12. In a machine according to claim 11, wherein the cam means includes a cam follower mounted on the bottom portion of the mandrel.